(12) United States Patent
Baker et al.

(10) Patent No.: US 7,535,436 B2
(45) Date of Patent: May 19, 2009

(54) LIGHT BEAM DELIVERY SYSTEM

(76) Inventors: David James Baker, 288 Middle St., West Newbury, MA (US) 01985; Richard A. Baker, Jr., 288 Middle St., West Newbury, MA (US) 01985

( * ) Notice: Subject to any disclaimer, the term of this patent is extended or adjusted under 35 U.S.C. 154(b) by 135 days.

(21) Appl. No.: 11/625,351

(22) Filed: Jan. 22, 2007

(65) Prior Publication Data
US 2008/0042972 A1    Feb. 21, 2008

Related U.S. Application Data

(63) Continuation-in-part of application No. 11/465,806, filed on Aug. 19, 2006.

(51) Int. Cl.
*G09G 3/00* (2006.01)
(52) U.S. Cl. .......................... 345/32; 348/744; 353/100
(58) Field of Classification Search ................. 345/156, 345/157, 32; 348/744; 359/384, 448, 443; 353/100, 101
See application file for complete search history.

(56) References Cited

U.S. PATENT DOCUMENTS

| | | | | |
|---|---|---|---|---|
| 3,668,984 A | * | 6/1972 | Rosin | 396/554 |
| 5,398,082 A | * | 3/1995 | Henderson et al. | 348/781 |
| 6,729,734 B2 | * | 5/2004 | Childers et al. | 353/122 |
| 6,945,652 B2 | * | 9/2005 | Sakata et al. | 353/30 |
| 6,991,336 B2 | * | 1/2006 | Matsui | 353/94 |
| 7,102,700 B1 | * | 9/2006 | Pease et al. | 348/744 |
| 2004/0135744 A1 | | 7/2004 | Bimber | |
| 2005/0128441 A1 | * | 6/2005 | Morgan | 353/102 |

OTHER PUBLICATIONS

Misbubishi Pocket Projector, Information Sheet.
International Search Report for PCT/US07/76044.

* cited by examiner

*Primary Examiner*—Amr Awad
*Assistant Examiner*—Stephen G Sherman

(57) ABSTRACT

A device for projecting images from a video generating device such as a computer, television receiver, or similar device onto a screen or other surface is described in this invention. The device uses a rotating disk containing numerous lenses to direct a light beam from a laser or other light source towards the screen. In one embodiment, a pulsed laser light from red, green, and blue lasers are combined into a single light pulse that is transmitted through the rotating disk that transmit each light pulse to a specific location on the screen.

12 Claims, 7 Drawing Sheets

LIGHT BEAM DELIVERY SYSTEM

CROSS REFERENCE TO RELATED APPLICATIONS

Figure 1:
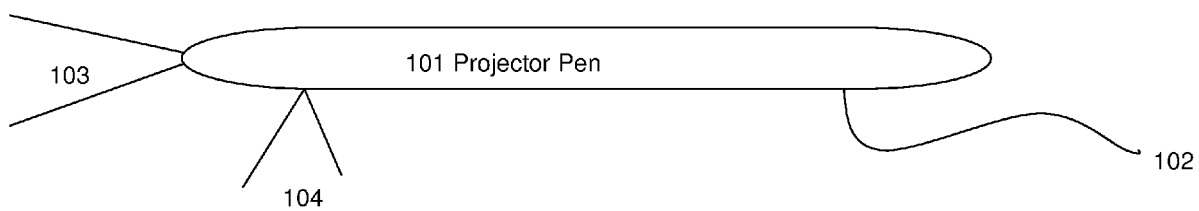

This application claims the benefit of U.S. patent application Ser. No. 11/465806, entitled "Projector Pen", filed on Aug. 19, 2006, which is incorporated herein by this reference.

FIELD OF INVENTION

This invention relates to the delivery of light images from a computer, a television receiver, or other similar device, and in particular addresses the use of a rotating disk of lenses to direct the light.

BACKGROUND

For thousands of years, man has tried various methods to communicate with groups of people, in classrooms, meetings and large groups. For most of the time, a speaker used his voice and hand movements to communicate with his audience. But this had it limitations, particularly in regards to technical data. So the next step was to use paper charts and diagrams that the speaker could flip through to provide his audience with detailed data. This had the problem of being particularly bulky and difficult to move between locations.

The next advancement involved the use of overhead projectors and foil slides. For most of the latter half of the twentieth century, most meeting rooms contained an overhead projector. These projectors contained a high wattage light bulb below a flat topped lens. The bulb projected light through the lens and through the speaker's foil. The light then traveled through another set of lenses and a mirror, that turned the image 90 degrees for projection onto a screen or other surface. The speaker prepared a set of foils that contained his presentation information. These foils were either hand drawn or printed on a laser printer.

This method had the disadvantage that the slides were not easy to change on the fly, and could be hard to rearrange in the middle of a presentation. As a result, there was a great need to find a more convenient method of directly projecting presentations onto a screen.

The solution came in the form of LCD projectors. These projectors connected directly to the computer, typically using the external monitor port on the computer. The computer generates the image and transfers the image to the projector. The projector then uses a high powered bulb to convert the image into light. The white light from the bulb is split using dichroic mirrors into red, green, and blue light beams that are directed to small LCDs that allow or disallow portions of the light beam to proceed to a dichroic combiner cube. The dichroic combiner cube reassembles the red, blue and green light beams into a combined beam. This is then projected through a lens to the screen or wall.

However, these devices have the disadvantage of being heavy and bulky. Even the best devices weigh 2-4 kilograms (roughly 4-8 pounds) and can take up the volume of a ream of paper. A lighter and more portable solution is needed. Something of a size and weight that can easily be carried in a pocket or a briefcase. But the current technologies can not be made small enough to fit in such a package. This invention addresses the abovementioned problem.

FIGURES

Figure 2:
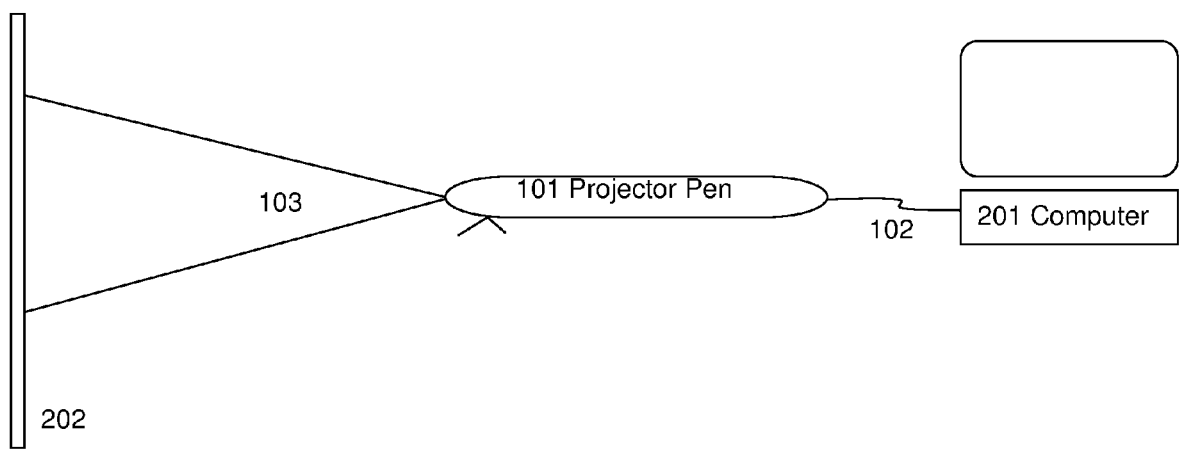
Figure 3:
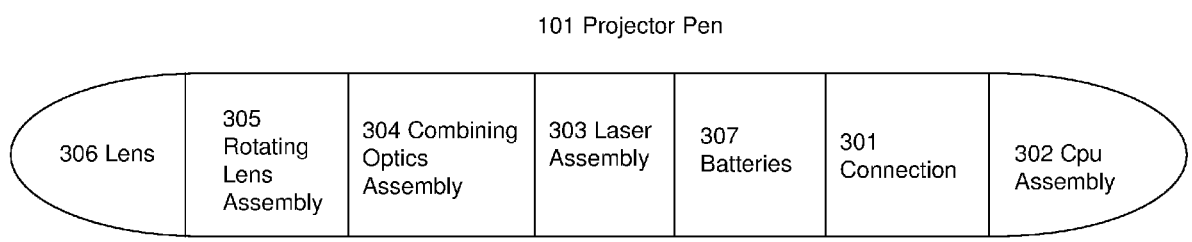
Figure 4:
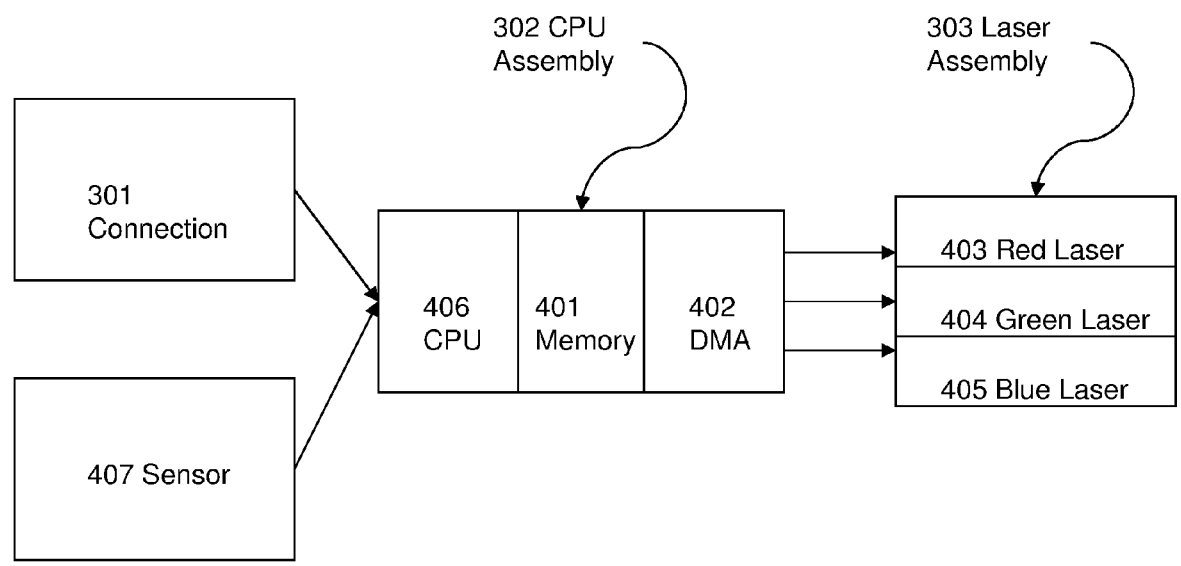
Figure 5:
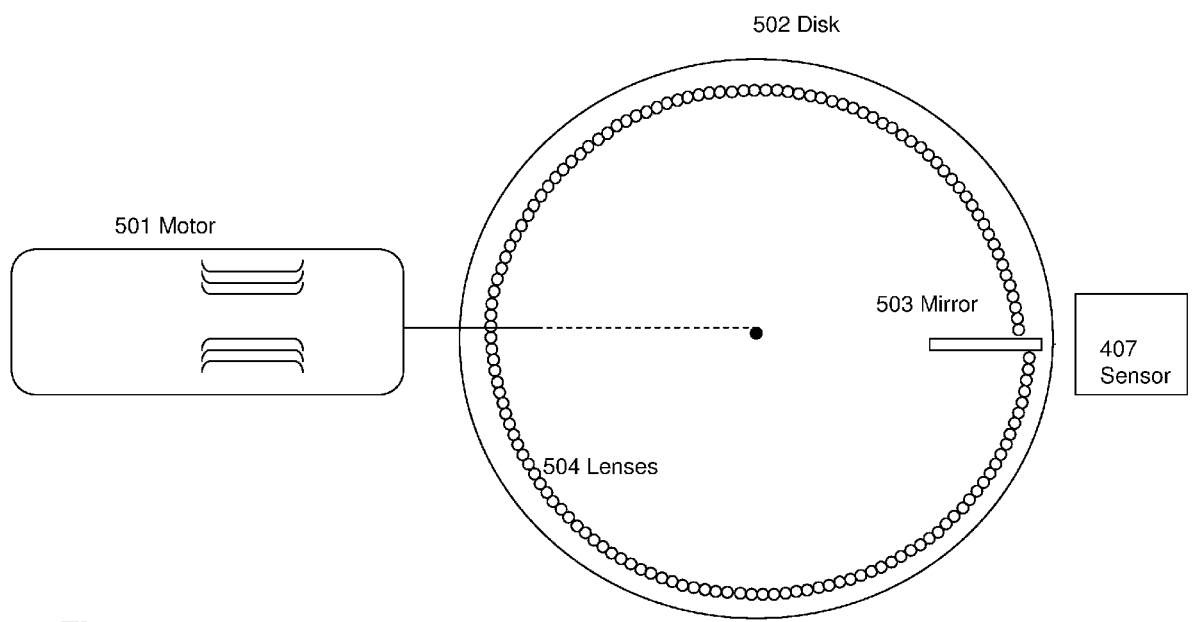
Figure 6:
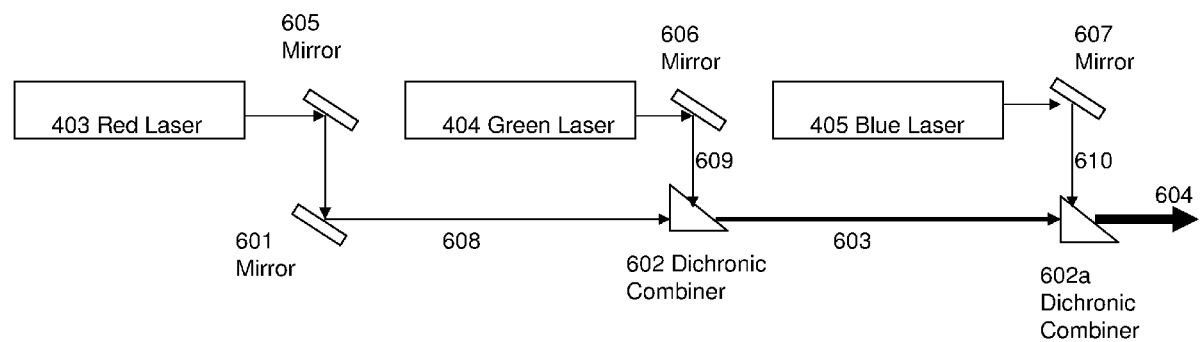
Figure 7:
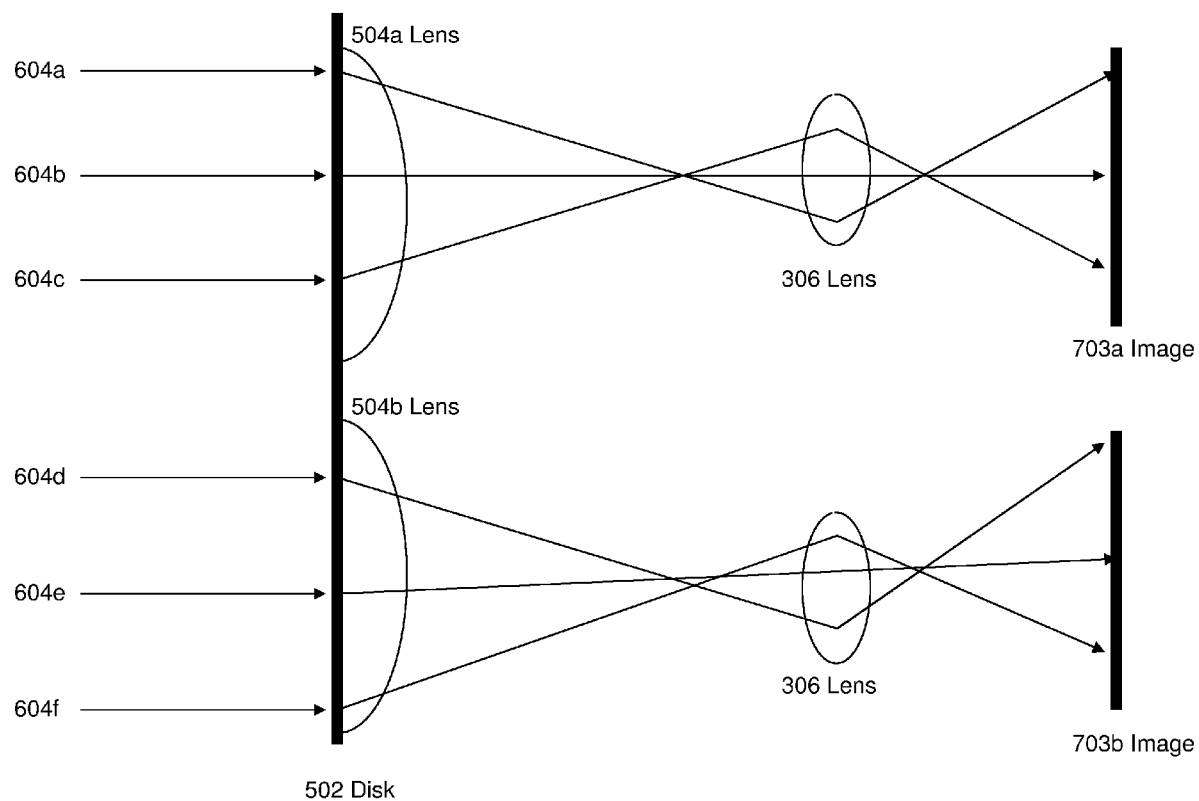

FIG. 1 shows a picture of the projector pen device.
FIG. 2 show a drawing of the projector pen device in use.
FIG. 3 shows and internal drawing of the positioning of the internal elements of the projector pen.
FIG. 4 is a functional diagram of the electrical components of the projector pen.
FIG. 5 is a diagram of the rotating disk assembly.
FIG. 6 shows the path of light through the projector pen.
FIG. 7 show the path of light through the rotating lenses.

SUMMARY OF THE INVENTION

A light beam delivery system and method for delivering a beam of light across a surface by sending the beam of light through a rotating disk where the rotating disk contains a multitude of lenses, such that the lenses are aligned to direct the beam of light across the surface, perhaps to create a visible image. The beam of light could be pulsed and or colored. The beam of light could be directed from a television receiver or from a computer.

An apparatus for the delivery of an image to a surface, the apparatus made up of an electronic representation of an image that is transformed by a processing mechanism into pulses of light where the pulses of light are transmitted through a rotating disk of a multitude of lenses, wherein the pulses of light are synchronized with the rotating disk such that the pulses of light form a visible representation of the image on the surface. The pulses of light could be made up of various colors.

DESCRIPTION

FIG. 1 shows a drawing of the projector pen 101. In one embodiment, this device is small, perhaps the size of a pen, with a length of 15 centimeters (about 6 inches) and a width of 1 centimeter (about $3/8^{th}$ inch). This device would weigh about 400 grams (around 14 oz). The intention is for the device to be easily carried in a pocket or in a briefcase without taking much room or adding much additional weight.

The projector pen 101 is supported on a table or desk by two legs 104 and the anterior base of the projector pen 101, near the cable 102. The cable 102 attaches to the projector pen 101 on the lateral side of the anterior of the device. This cable 102 may be a USB, Firewire (IEEE 1394), Ethernet (with or without power over Ethernet) or similar cable, and may be wired directly into the projector pen 101 or may connect to a connector at the end of the projector pen 101. One type of connector on the projector pen 101 may be a type B mini-USB connector or alternatively an RJ-45 Ethernet jack.

In another embodiment, the cable could be a video cable using a standard interface such as S-Video; RCA Video; 15-Pin VGA, or similar.

The other end of the projector pen 101 contains a mechanism for allowing a visible image 103 to be transmitted from the projector pen 101.

The legs 104 and the base of the projector pen 101 that sit on the table have feet made of rubber or similar material to prevent slippage of the device during operation and to provide stability of the image. The legs 104 could be mounted directly on the projector pen 101 and the legs 104 could telescope to adjust the vertical location of the projected image on the screen 202. Alternatively, the legs 104 could snap onto the projector pen 101 anywhere along the length of the device to adjust the vertical location of the display. Or the telescoping legs 104 could be screwed into the projector pen 101.

The anterior end of the projector pen 101 has a soft rubber base for supporting the back end of the projector pen 101 on a table. Alternately, this rubber base could have a ball bearing mounted pivot to allow for adjusting the angle of the projector pen 101 depending upon the location of the screen 202.

In an alternate embodiment, the projector pen could be mounted to the side of a personal computer 201, a laptop or a personal data assistant (PDA) such as a Palm Trio or similar device.

Alternatively, the projector pen 101 could be mounted using a ball mount on top of a pedicle, similar to the old pedicle pens. The pedicle would provide a stable base for the projector pen 101, and the ball mount would allow adjustment of the direction of the projector pen 101. The ball mount should be stiff enough to prevent unintended movement yet flexible enough to allow adjustment. In this embodiment, one or more functions of the projector pen 101 could be transferred to the pedicle. The pedicle would be used to add stability to the projector pen 101.

FIG. 2 shows the projector pen 101 in use. The projector pen 101 is connected to a computer 201 via a cable 102. The computer 201 creates the image and transfers the image via the cable 102 to the projector pen 101. The projector pen 101 converts the digital image into a visual image 103. This image is projected to a screen 202. Alternatively, the image could be projected onto a wall or any other surface.

In an alternative embodiment, the projector pen 101 may be connected to the computer 201 through a wireless interface. The wireless antenna could be installed inside of the projector pen 101, or the antenna could be designed inside a clip on the outside of the projector pen 101. This clip could be similar to a ball point pen clip, and used to clip the projector pen 101 to a shirt pocket. In this embodiment, the power for the device could be supplied by one or more batteries 307 or through a power cable.

One advantage of the battery embodiment is that a presentation could be downloaded into the memory 401 of the projector pen 101, and the projector pen 101 could be used independently of the computer 201. In this embodiment, buttons would have to be added to the projector pen 101 to enable the user to cycle through the images stored in memory 401. The battery embodiment could be used with a wireline or wireless interface.

The buttons in the battery embodiment (buttons could be used in any embodiment) could be mounted to the side of the projector pen 101 (or on the base of a pedicle embodiment). Buttons could enable the projector pen 101 to be turned on and off, another button could tell the projector pen 101 to move to the next image in memory, and a third button could tell the projector pen 101 to move to the previous image in memory.

The computer 201 could be a standard personal computer. The computer 201 could have a separate monitor or could use the projector pen 101 as the monitor. The computer 201 has a CPU and memory, and typically, but not necessarily, could have a mass storage device such as a disk drive and could have a network connection.

Typically, the computer 201 would be running a program for creating video images for display, such as Microsoft Powerpoint, Windows Media Player or similar program.

Alternatively, the computer 201 could be replaced by another video generating device such as a television receiver. The television receiver could either receive wireless signals or through cable or DSL wireline connections.

The projector pen 101 can also serve as a display device for a PDA. This is very convenient for a businessman to use his PDA to drive a PowerPoint presentation through the projector pen 101, instead of using a heavy laptop and LCD projector.

FIG. 3 shows the internal functionality of the projector pen 101. Starting with the entry of data and power signals near the anterior end of the device, the signal and power enter the projector pen through the connection 301. The connection 301 could be a mini-USB connector for accepting a USB cable. The signal comes in the connector and is processed by transceivers. After being received, the signals are transmitted to the CPU assembly 302 for processing.

The power also comes into the unit via the USB cable 102. The power is filtered to remove power spikes and is then split into the proper voltages for powering the CPU assembly 302, the rotating lens 305, and the laser assembly 303. In order to simplify the power supply design and minimize the size of the projector pen 101, every effort is made to maintain a single voltage requirement for all components. For example, by choosing a CPU assembly 302 with a 5 volt DC requirement to match the voltage available on the USB cable, power will not have to be converted. 5 volt DC semiconductor laser diodes 403, 404, 405 and a 5 volt DC motor to drive the rotating lens 305 could also be used. By matching all other components to a single voltage, size and complexity of the power supply can be reduced. USB cables can provide up to 500 mA at 5 VDC.

The projector pen 101 could also include batteries 307 to allow the projector pen to display images when the projector pen 101 is disconnected from a power source. This may be useful in applications where a computer 201 is not available. The batteries 307 could also be rechargeable to eliminate the need to open the projector pen 101 to remove the batteries 307.

Alternately, the projector pen 101 could be powered by a separate power cable that is connected to an AC power transformer. This transformer would connect to the 110 AC power in from the electric power grid, and convert the power to the power level required by the projector pen 101.

The CPU assembly 302, in one embodiment, is a single system on a chip design with logic cells to incorporate the decoding of the USB protocol and converting the information received into signals to energize or deenergize each of the three lasers 403, 404, 405 in the laser assembly 303. The CPU assembly 302 also takes an input from a sensor 407 monitoring the rotating lens 305 so that the firing of the lasers 403, 404, 405 can be synchronized to the location where the lens will direct the light.

There are a number of possible sensor devices 407 that could be used for this purpose, from a magnetic sensor to a mechanical sensor. One possible sensor would be a photo sensor 407 that detects laser light reflected from a small mirror 503 on the rotating disk 502.

Because of the high speed data requirements to display a medium resolution video image on the screen 202, the CPU assembly 302 may be designed to include a DMA 402 path to move data from the memory 401 to the laser assembly 303. For XGA resolution of 1024×768 pixels refreshed at 60 times per second, one bit of data must be sent to each of the three lasers 47 million times per second. For UXGA resolution of 1600×1200 pixels, the data must be sent to the lasers 115 million times per second.

The laser assembly 303 is electrically connected to the CPU assembly 302 (more specifically, the DMA 402 ports of the CPU chip 302). The CPU assembly 302 determines when each laser 403, 404, 405 provides light. The light from the laser assembly 303 is sent towards the screen 202.

Mechanically, the laser assembly 303 is located next to the connector 301. This is to put the weight of the lasers as close to the anterior end of the projector pen 101 as possible.

The laser assembly 303 is a mechanism for generating a light beam or a set of light beams. Several embodiments are described below, but other mechanisms for generating light beams are envisioned in this light beam delivery system.

One embodiment includes three lasers 403, 404, 405 that provide three different colors to combine into a combined light pixel 604. This provides $2^3$ or 8 different colors per pixel. To increase the number of colors, the intensity of each laser 403, 404, 405 can be adjusted by varying the intensity of the beam by pulsing the laser at varying rates. On some lasers, the power can be reduced to reduce the intensity of the beam. With either method, the number of colors can be increased to any level depending upon the design of the video circuitry within the CPU assembly 302 and depending upon the amount of memory 401 available for the video in the CPU assembly 302.

Alternatively, the lasers 403, 404, 405 could be replaced with three (one red, one green, and one blue) high intensity lights or a single light could be used that passes through a diachronic prism to split the light into red, green, and blue light beams.

Once the light beams leave the lasers 403, 404, 405, the three light beams are combined in the combining optics 304 (see FIG. 6 for more detail) into a combined light beam 604 containing the red, green, and blue light elements from the lasers 403, 404, 405. The combined light beam 604 is then moved off center to a location parallel to the length of the projector pen 101 close to an edge.

The combined light 604 exiting from the combining optic assembly 304 next passes through the rotating lens assembly 305 that is designed to bend the light to the precise location on the screen 202 for that particular pixel. The image is formed by sending each burst of light from the laser to a location on the screen 202 in $\frac{1}{60}^{th}$ of a second. As such, the rotating lens assembly 305 rotates 60 times per second, powered by a small electric motor 501. The rotating lens assembly 305 is designed with 768 lenses 504 mounted on a circular disk 502 for XGA resolution or 1200 lenses 504 for UXGA resolution. Each lens 504 will bend the combined light 604 from the combined optics assembly 303 across a line on the screen 202. The next lens 504 is offset slightly lower than the previous lens so that the following line is displayed on the screen 202 just below the previous line.

Alternatively, the rotating disk 502 could have a series of fins or mirrors that bend the light as the rotating disk spins, bending or reflecting the light across each row. These fins or mirrors would act as lenses 504.

Throughout this specification examples are used based upon the UXGA video specification. Any other video standard could be substituted by replacing the number of lenses, lines, pixels, and colors described herein with the appropriate parameters from the desired video standard.

The rotating lens assembly 305 contains a sensor 407 to locate the top left hand corner of the image and to signal the CPU assembly 302 so that the rotating lens assembly 305 can be synchronized with the laser assembly 303.

The lens 306 then focuses the light beam and directs the light beam from the rotating lens 305 to the screen 202.

FIG. 4 shows the electrical flow of information through the projector pen 101. Video and other information enters the projector pen 101 through the connection 301 and is then transferred to the CPU assembly 302. The video information is transferred by the CPU 406 into memory 401 either directly or after being reformatted for DMA transfer to the lasers 403, 404, and 405. Other instructions received by the projector pen 101 are processed by the CPU 406 and entire CPU assembly 302 as necessary.

Once the video data is in memory 401, the DMA circuitry 402 will take the information from the memory 401 and transfer the information to the red laser 403, green laser 404, and blue laser 405. There are a number of different schemes that could be used to perform this transfer. For instance, the memory 401 could be structured in 48 bit words, with 16 bits assigned to each of the red 403, green 404, and blue 405 lasers. The 16 bits could be used to direct each laser to transmit light at one of 65,535 different intensity levels.

Another scheme could use the pulsating nature of the lasers to regulate the intensity, by using the color specific intensity information to pulse the laser to vary the intensity.

The CPU assembly 302 also receives information from the sensor 407 that synchronizes the location of the rotating lens disk 502. The CPU assembly 302 uses this information to direct the DMA 402 to start sending the information to the lasers 403, 404, 405. Because the rotating lenses 305 determines where the each bit of light (each pixel) is placed on the screen 202, the rotating lens disk 502 must be synchronized with the lasers 403, 404, 405.

The rotating lens assembly 305, as seen in FIG. 5, is responsible for moving pulses of light from the three lasers 403, 404, 405 to 1600×1200 different locations on the screen 202. Each pulse directed to a fixed location on the screen 202. This is done with a disk 502 that has 1200 different lenses 504 (shown as a representation, the actual disk 502 will have many more lenses 504 than are actually drawn on FIG. 5, the lenses placed in a single rotation of a spiral) placed in a circle near the outer edge. Each lens 504 is offset slightly from its predecessor so that it focuses the combined light pulses 604 one line below the line generated by the previous lens. As the rotating lenses 504 turn, the light from the lasers 403, 404, 405 is first bent by a lens 504 to sweep across a line, creating a full line of pixels on the screen 202. The next lens 504 displays the next line. This process continues for a full rotation of the disk 502, passing 1200 lenses 504 and displaying 1200 lines of light on the screen 202.

The design of the lasers 403, 404, 405 is such that 1600 pulses of light are sent through each lens 504 during each rotation of the disk 502, creating 1600 pixels for each line. In an alternate design, the lasers 403, 404, 405 could be left on if the subsequent pixel has the same intensity, effectively displaying a line of light on the screen 202.

The rotating lens disk 502 is spun by a motor 501 at 60 rotations per second so that the screen is refreshed 60 times per second. This will assure that the human eye sees a complete picture on the screen 202 and that movement or images on the screen 202 seem natural.

The rotating lens disk 502 also has a sensor 407 to detect the position of the disk 502. The sensor 407 is a photo sensor that will detect the reflection of the laser light off a small mirror 503 mounted on the disk 502. The mirror 503 will reflect the combined light 604 from the combined optics assembly 304 back to the photo sensor 407. The mirror will also provide a brief gap in time to allow the CPU 406 to setup the DMA 402 for the transfer of the next frame.

FIG. 6 shows the path of the light through the combined optics assembly 304. Red light 608 generated from the red laser 403 passes through a mirror 605 and then is then sent through a second mirror 601 that directs the light parallel to the side of the projector pen 101. Green light 609 from the green laser 404 passes through mirror 606. The red light 608 is then combined with the green light 609 at the dichroic combiner 602 into a combined red-green light 603. Similarly, the blue laser 405 directs the blue light 610 through a mirror 607 to the diachronic combiner 602a. The red-green light 603 is then combined with the blue light 610 at the second dichroic combiner 602a to form the combined (red-green-blue) light 604. This combined light is then sent to the rotating lens assembly 305.

In another embodiment, the lasers 403, 404, and 405 could be mounted sideways to direct their light to the side of the projector pen 101 directly at the mirror 601, and the diachronic combiners 602 and 602a. The order of the lasers is not important in this invention, and could be combined in any other order.

FIG. 7 demonstrates the movement of the light through the rotating lens 305 assembly. A first pulse of combined light 604a from the combing optics assembly 304 moves through the first lens 504a (mounted on the rotating disk 502) and is bent towards the right-most position of the top line of the image 703a. The combined light 604a is then focused through the final lens 306 to the left-most position of the top line. About 10 nanoseconds later, a second pulse of combined light is sent through the first lens 504a and is bent towards the position (after going through the final lens 306) of the second pixel location on the top line of the image 703a. Later, combined light pulses 604b and 604c hit the first lens 504a and are bent towards their respective positions on the top line of the image 703a. Each pulse of combined light 604a, 604b, 604c originates at the same location and travels the same path until it reaches the lens 504a on the disk 502. The disk 502 is rotating and lens 504a is moving. As each pulse of combined light 604a, 604b, 604c reaches the lens 504a, they are bent to the appropriate position on the top line of the image 703a (after being flipped by the final lens 306). Final lens 306 is stationary or could be movable to allow for focusing.

Once the top line of the image 703a is complete, the second lens 504b moves into position, and combined light pulses 604d, 604e, 604f are directed through the lens 504b towards the second line of the image 703b. Second lens 504b is offset slightly from first lens 504a such that it directs the light to the location of the next line of the image. This continues for each pixel on each line of the complete image.

In another embodiment of the invention, the signals from the computer 201 or television receiver could be in the form of analog video signals from a S-Video, RCA Video, 15-Pin VGA or similar interface that are transferred directly to circuitry that drive the laser assembly 303. In this embodiment, both the CPU assembly 302 and the batteries 307 would be optional.

In still another embodiment of this invention, the rotating disk mechanism could be used to direct the beam from a single cutting laser to a surface to be cut or etched.

The forgoing descriptions of various embodiments of the invention have been presented for purposes of illustration and description. It is not intended to limit the invention to the precise forms disclosed. Many modifications and equivalent arrangements will be apparent.

The invention claimed is:

1. A light beam delivery system for delivering a beam of light across a surface comprising
    a source for a beam of light,
    said beam of light consisting of a stream of pixels of information to display on the surface,
    said pixels sent through a multitude of lenses on a rotating disk, such that each of the lenses receives multiple pulses of light and is aligned to direct a line of the pixels to a specific location on the surface.

2. The light beam delivery system of claim 1 wherein the beam of light directed across the surface forms a visible image on the surface.

3. The light beam delivery system of claim 2 wherein the visible image is generated by a computing device.

4. The light beam delivery system of claim 2 wherein the visible image is generated by a television receiver.

5. The light beam delivery system of claim 1 wherein the beam of light has varying colors.

6. A method of delivering a beam of light across a surface comprising
    generating a beam of light,
    said beam of light consisting of a stream of pixels of information to display on the surface,
    transmitting said pixels through a multitude of lenses on a rotating disk, such that each of the lenses receives multiple pulses of light and is aligned to direct a line of the pixels to a specific location on the surface.

7. The method of claim 6 wherein the beam of light directed across the surface forms a visible image on the surface.

8. The method of claim 7 wherein the visible image is generated by a computing device.

9. The method of claim 7 wherein the visible image is generated by a television receiver.

10. The method of claim 6 wherein the beam of light has varying colors.

11. An apparatus for the delivery of an image to a surface comprising
    an electronic representation of the image;
    a processing mechanism to transform the image into pulses of light;
    said pulses of light transmitted through a multitude of lenses on a rotating disk, wherein the pulses of light are synchronized with the rotating disk, wherein each of the lenses receives multiple pulses of light and is aligned to direct a line of pixels to a specific location on the surface, such that the pulses of light form a visible representation of the image on the surface.

12. The apparatus of claim 11 wherein the pulses of light are comprised of many different colors.

* * * * *